United States Patent
Iaccarino (10) Patent No.: US 9,638,527 B2
(45) Date of Patent: May 2, 2017

(54) TECHNIQUE FOR SIGNALLING TELEPHONE CALLS DURING A ROUTE GUIDANCE

(75) Inventor: Silvio Iaccarino, Erlangen (DE)

(73) Assignee: Elektrobit Automotive GmbH, Erlangen (DE)

( * ) Notice: Subject to any disclaimer, the term of this patent is extended or adjusted under 35 U.S.C. 154(b) by 962 days.

(21) Appl. No.: 13/211,506

(22) Filed: Aug. 17, 2011

(65) Prior Publication Data

US 2012/0214457 A1 Aug. 23, 2012

(30) Foreign Application Priority Data

Aug. 18, 2010 (DE) .......................... 10 2010 034 684

(51) Int. Cl.
*G01C 21/26* (2006.01)

(52) U.S. Cl.
CPC ................... *G01C 21/26* (2013.01)

(58) Field of Classification Search
USPC ............................. 455/456.1–457
See application file for complete search history.

(56) References Cited

U.S. PATENT DOCUMENTS

| | | | |
|---|---|---|---|
| 7,395,153 B1 | 7/2008 | Nesbitt et al. | |
| 9,451,584 B1* | 9/2016 | Cosenza | H04M 3/42 |
| 2002/0077741 A1* | 6/2002 | Hanebrink | G01C 21/26 |
| | | | 701/117 |
| 2004/0172193 A1* | 9/2004 | Monde | G01C 21/3679 |
| | | | 701/425 |
| 2005/0032502 A1* | 2/2005 | Tokudome | H04M 1/6091 |
| | | | 455/403 |
| 2005/0256635 A1 | 11/2005 | Gardner et al. | |
| 2007/0135995 A1* | 6/2007 | Kikuchi | G01C 21/20 |
| | | | 701/533 |
| 2007/0208497 A1* | 9/2007 | Downs | G08G 1/0104 |
| | | | 701/117 |
| 2007/0266191 A1* | 11/2007 | Schnepp | H04H 20/55 |
| | | | 710/264 |
| 2008/0021638 A1* | 1/2008 | Kobayashi | G01C 21/30 |
| | | | 701/532 |
| 2008/0051995 A1* | 2/2008 | Lokshin et al. | 701/210 |
| 2008/0188271 A1* | 8/2008 | Miyauchi | G10K 11/1788 |
| | | | 455/569.2 |
| 2008/0195306 A1* | 8/2008 | Moinzadeh | G08G 1/096811 |
| | | | 701/420 |
| 2008/0243326 A1* | 10/2008 | Dobler et al. | 701/29 |
| 2009/0099769 A1* | 4/2009 | Cheung et al. | 701/209 |
| 2009/0216389 A1* | 8/2009 | Placke | B60Q 9/00 |
| | | | 701/1 |
| 2009/0216433 A1 | 8/2009 | Griesmer et al. | |
| 2010/0105446 A1* | 4/2010 | Charlier | H04M 1/6066 |
| | | | 455/569.1 |

(Continued)

FOREIGN PATENT DOCUMENTS

| | | |
|---|---|---|
| DE | 10052654 A1 | 5/2002 |
| DE | 10226425 A1 | 12/2003 |

(Continued)

OTHER PUBLICATIONS

Chakraborty et al., "Multiobjective Route Selection for Car Navigation System using Genetic Algorithm" Proceedings of the 2005 IEEE Mid-Summer Workshop on Soft Computing in Industrial Applications, Jun. 28-30 2005, pp. 190-195.

(Continued)

*Primary Examiner* — Steven Kelley
(74) *Attorney, Agent, or Firm* — Carter, DeLuca, Farrell & Schmidt, LLP (57) ABSTRACT

The present disclosure relates to a technique for controlling the signalling of incoming telephone calls during a route guidance by means of a navigation device. A method aspect includes the steps of detecting an incoming telephone call, determining a distance to a forthcoming maneuver instruction or route reference point on a predetermined route in response to the detected telephone call, and delaying the incoming telephone call until a maneuver instruction has been output if the determined distance to the forthcoming maneuver instruction or route reference point falls short of a predetermined threshold value.

17 Claims, 3 Drawing Sheets

(56) References Cited

U.S. PATENT DOCUMENTS

| | | | | |
|---|---|---|---|---|
| 2010/0144397 A1* | 6/2010 | Azuma | ............. | G01C 21/26 |
| | | | | 455/569.2 |
| 2011/0257966 A1* | 10/2011 | Rychlik | ............. | G01C 21/3629 |
| | | | | 704/214 |
| 2013/0217371 A1* | 8/2013 | Zhang | ............. | H04W 4/025 |
| | | | | 455/415 |

FOREIGN PATENT DOCUMENTS

| | | |
|---|---|---|
| DE | 10338566 A1 | 3/2005 |
| DE | 102008043392 A1 | 5/2010 |
| DE | 102009017643 A1 | 10/2010 |
| EP | 2 068 123 A2 | 6/2009 |
| WO | 03/106222 A1 | 12/2003 |
| WO | 2010/022561 A1 | 3/2010 |
| WO | 2010060662 A1 | 6/2010 |

OTHER PUBLICATIONS

Office Action for corresponding European Application No. 11006557.0 dated Dec. 19, 2011.

\* cited by examiner

TECHNIQUE FOR SIGNALLING TELEPHONE CALLS DURING A ROUTE GUIDANCE

TECHNICAL FIELD

The present disclosure relates generally to the output of manoeuvre instructions during a navigation operation. In particular, the invention relates to a technique for signalling telephone calls during a route guidance.

BACKGROUND

During a navigation operation (e.g. in the course of a drive) there is a need to be supplied with current traffic information relating to the travel route, to forthcoming manoeuvres, to the current traffic situation etc. In this way, a driver can prepare in good time for forthcoming manoeuvres and can react appropriately thereto. Consequently, this information contributes to road safety, on the one hand, and enhances the traveling comfort, on the other hand. At the same time, there is a need to communicate with the environment, in particular in case of longer drives. Hereby, mobile telephones regularly come into operation.

One technical challenge consists in making items of information that are temporally close together and from differing sources available to a driver in such a manner that, on the one hand, they are consciously perceived by the driver and, on the other hand, they do not distract the driver too much while driving. For example, the output of acoustic and/or visual manoeuvre instructions for route reference points of a predetermined route may coincide with a telephone call. In this connection it cannot be ruled out that a driver being fixed upon the traffic events and the telephone conversation will ignore one or more manoeuvre instructions and consequently stray from the predetermined route at a route reference point.

SUMMARY

It is the object to provide a method and an apparatus for controlling the signalling of incoming telephone calls and manoeuvre instructions during a route guidance, which avoid at least one of the aforementioned disadvantages.

For this purpose, a method is provided for controlling a signalling of incoming telephone calls during a route guidance, the method comprising the following steps: detecting an incoming telephone call; determining a distance to a forthcoming route reference point or to an output of a forthcoming manoeuvre instruction on a predetermined route in response to the detected telephone call; and delaying the signalling of the incoming telephone call until a manoeuvre instruction has been output if the determined distance to the forthcoming route reference point or to the output of the forthcoming manoeuvre instruction falls short of a predetermined first threshold value, wherein the manoeuvre instruction that is output comprises a modified instruction in form of an abbreviated instruction with respect to an originally intended manoeuvre instruction.

Designated as route reference points of a route are those points, ordinarily defined by means of geographical coordinates, at which a driver may leave a road that is presently being driven along. Route reference points are defined, in particular, at intersections and exits. The turning-off at a route reference point constitutes a manoeuvre that depends on the geometry of the intersection and on the predetermined route (choice of road at the route reference point). In the manoeuvre instruction the attention of the driver is drawn to the manoeuvre at the forthcoming route reference point. Generally, the manoeuvre instruction is output a certain distance ahead of the route reference point (e.g. a few hundred meters).

The telephone call may be a voice call. Within the scope of the present disclosure, however, other telecommunications services are also encompassed by the term 'telephone call', including text messages (e.g. SMS or MMS), traffic-announcement services and the like.

The manoeuvre instruction that is output for the forthcoming route reference point may have been modified with respect to an originally intended (e.g., for a later time) manoeuvre instruction. The originally intended manoeuvre instruction may have been intended to be output at a time instance that corresponds to a predetermined spatial distance to the forthcoming route reference point. The originally intended manoeuvre instruction may comprise information about at least one of the spatial distance to the manoeuvre, the street to be followed, the street to be chosen at the route reference point and the geometry of the junction or intersection (e.g. roundabout, T-junction, etc.). The modified manoeuvre instruction may be adjusted to the current driver's position. For instance, the output manoeuvre instruction may include information about the current distance to the forthcoming route reference point. Furthermore, the modified manoeuvre instruction may include instructions or information differing from the originally intended manoeuvre instruction. The modified manoeuvre instruction may be output in addition to or instead of the originally intended manoeuvre instruction. The manoeuvre instruction may be given acoustically and/or visually.

Furthermore, information relating to road names and/or to the geometry of the intersection (e.g. roundabout, T-junction, etc.) may be suppressed in the abbreviated instructions. The advantage of abbreviated instructions lies in the fact that the delay of the signalling of the incoming telephone call by reason of the manoeuvre instruction is kept as slight as possible.

The manoeuvre instruction for the forthcoming route reference point may be temporally advanced with respect to the originally intended instruction for the forthcoming route reference point. If an incoming telephone call is detected, the output of the manoeuvre instruction can be temporally advanced, and at the same time the signalling of the incoming telephone call can be delayed until such time as the advanced manoeuvre instruction has been completely output. In this way, for example, forthcoming manoeuvre instructions and the receipt of a telephone call can be output acoustically and/or visually one after the other in a temporal succession. It can consequently be ensured that forthcoming manoeuvre instructions are not obscured by an incoming telephone call.

According to a further embodiment, a distance between the forthcoming route reference point and at least one following (e.g. the next-but-one) route reference point is ascertained. Alternatively, the distance between the forthcoming route reference point and at least one following route reference point can be determined when the distance to the forthcoming route reference point falls short of a predetermined further threshold value, wherein the magnitude of the further threshold value may be smaller than or even equal to the magnitude of the first threshold value. Depending on the distance with which the following route reference points follow, appropriate instructions can be included in the manoeuvre instruction.

If the distances to the forthcoming route reference point and between the forthcoming and at least one following route reference point are small, the probability increases that the telephone conversation will persist beyond the forthcoming route reference point and that further instructions relating to at least one following route reference point would follow during the telephone conversation. Since, the route reference points following the forthcoming route reference point are early enough determined, complicated route guidance within the predetermined route can be detected in good time, and the driver can be warned in good time by an appropriate manoeuvre instruction, or can have his/her attention drawn thereto.

According to a further embodiment, a local rerouting for the predetermined route can be determined if the distance to the forthcoming route reference point falls short of a predetermined second threshold value. In this case, the rerouting is determined, for example, on the basis of cartographic data in such a manner that further complicated manoeuvres or a succession of manoeuvres are/is avoided. In this case, the driver may have his/her attention drawn by the manoeuvre instruction to the forthcoming manoeuvre and the subsequent rerouting. Subsequent to this, the incoming telephone call can be accepted.

The determination of a rerouting as a response to an incoming telephone call may depend on further or alternative factors. For example, the determination of a rerouting may additionally or alternatively depend on a predetermined third threshold value for the distance between the forthcoming route reference point and the at least one following route reference point. If the distance of two consecutive route reference points is small or if the distance of several consecutive route reference points relative to the distance of the forthcoming route reference point is smaller than the third threshold value, a rerouting is determined, in order not to confront the driver with a complicated sequence of manoeuvres during a telephone call. Furthermore, the determination of a rerouting may depend on the type of road on which the vehicle is presently located. If, for example, a vehicle is located on a motorway, the probability of several complex manoeuvres following one another in series is low (and a rerouting makes no sense).

A rerouting can generally be carried out until the telephone call has been concluded. Subsequently, the driver can be guided back from the local rerouting onto the predetermined route.

The distance to the forthcoming route reference point or to the output of the forthcoming manoeuvre instruction or between consecutive route reference points can be determined in the form of a spatial distance or in the form of a time interval. In this connection a time interval may be estimated from a current driving speed and a determined spatial distance to a forthcoming route reference point or to the output of the forthcoming manoeuvre instruction or between two consecutive route reference points. As current driving speed, the speed of the vehicle at the time of receipt of the telephone call can be used. Corresponding thereto, the first, second and/or third threshold value can be specified in each instance as a time threshold value. The three threshold values may have been preset or may be determined by the driver. However, the use of spatial distances and spatial threshold values would also be conceivable.

The manoeuvre instruction that is output may depend on the distance to the forthcoming route reference point or to the output of the forthcoming manoeuvre instruction. For example, the manoeuvre instruction that is output may include additional information relating to the distance to the forthcoming route reference point which was determined at the time of receipt of the telephone call.

Furthermore, the invention provides a computer-program product with program code for implementing the method when the computer-program product is executed on a computer device (e.g. a navigation device). For this purpose the computer-program product may have been stored on a computer-readable recording medium (e.g. a memory card or a read-only memory).

Moreover, the invention provides an apparatus for controlling a signalling of incoming telephone calls during a route guidance, the apparatus comprising: a device for detecting an incoming telephone call; a device for determining an distance to a forthcoming route reference point or to an output of a forthcoming manoeuvre instruction on a predetermined route as a response to the detected telephone call; a delay device that has been set up to delay the signalling of the incoming telephone call until a manoeuvre instruction has been output if the determined distance to the forthcoming route reference point or to the output of the forthcoming manoeuvre instruction falls short of a predetermined first threshold value and a device for modifying a manoeuvre instruction, the modified manoeuvre instruction corresponding to an instruction that has been abbreviated with respect to an originally intended manoeuvre instruction.

According to one embodiment, the apparatus may further include a device for modifying a manoeuvre instruction. According to a further embodiment, the device may include a device for determining a local rerouting, which has been set up to calculate a local rerouting for the predetermined route if the distance to the forthcoming route reference point falls short of a predetermined second threshold value or the distance between the forthcoming route reference point and a subsequent route reference point falls short of a third threshold value.

The apparatus may furthermore have been integrated into a navigation device. In an alternative embodiment, the apparatus may be part of a mobile telephone or smartphone.

BRIEF DESCRIPTION OF THE DRAWINGS

Further details, aspects and advantages of the invention described herein will become apparent from the following drawings, in which.

DETAILED DESCRIPTION

Figure 1:
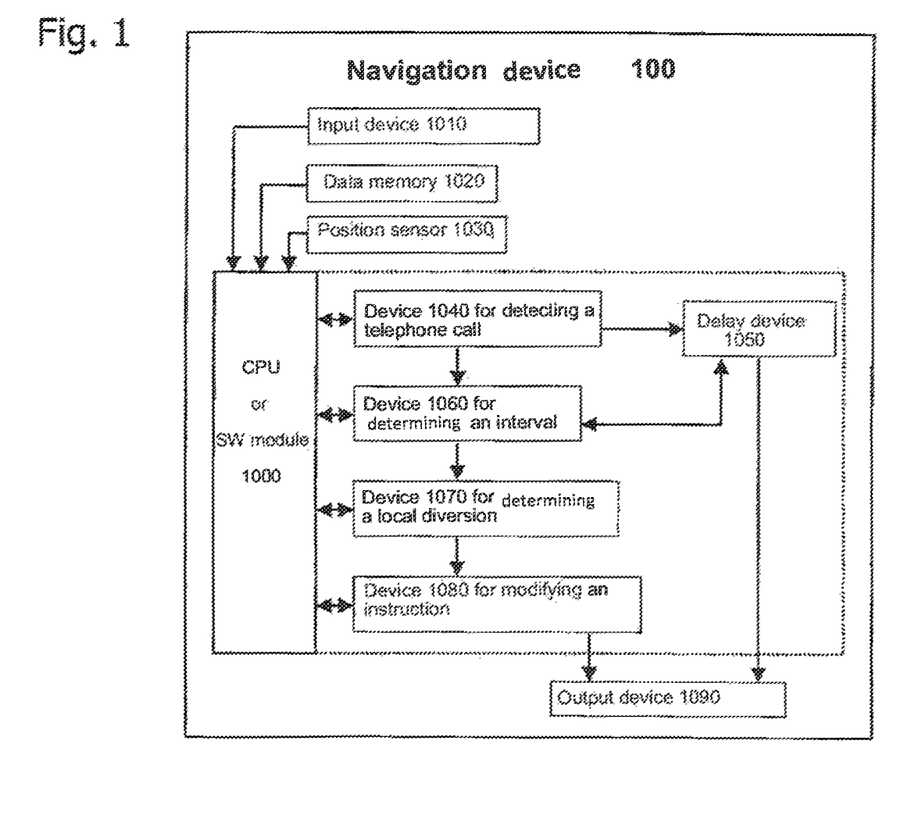
FIG. 1 shows a navigation apparatus according to an exemplary embodiment of the present invention.

FIG. 1 shows, in the form of a block diagram, an embodiment of an apparatus 100 in the form of a navigation device. The navigation device 100 may be realised as built-in device of a motor vehicle or may be realised in the form of a portable instrument (personal navigation device, PND). In such a case the navigation device 100 may be wired to or may be connected wireless with a mobile telephone, smartphone or personal digital assistant (PDA). As an alternative to this, the device 100 or parts thereof may have been implemented in a mobile telephone, smartphone or PDA.

The navigation device 100 comprises a core functionality 1000 which may have been implemented in the form of a CPU (central processing unit) or microprocessor or in the form of a software module (SW module). Furthermore, the navigation device 100 includes an input device 1010, a data memory 1020, a position sensor 1030 (e.g. a GPS sensor), a device 1040 for detecting a telephone call, a delay device 1050, a device 1060 for determining a distance, a device 1070 for determining a local rerouting, a device 1080 for modifying an instruction, and an output device 1090. The device 1040 for detecting a telephone call, the delay device 1050, the device 1060 for determining an distance, the device 1070 for determining a local rerouting and also the device 1080 for modifying an instruction may be in each instance implemented as stand-alone device communicating with the core functionality 1000 or as part of the core functionality 1000, as is indicated by the dashed extension of the core functionality 1000 in FIG. 1.

The input device 1010, the data memory 1020 and the position sensor 1030 are connected to the core functionality 1000 in communicating manner. Via the input device 1010 the core functionality 1000 obtains route-relevant data concerning destination, intermediate stops etc. Furthermore, the core functionality 1000 obtains current position information from the position sensor 1030 and from the data memory 1020 map data stored beforehand, which in each instance are made available on demand to the devices 1040, 1060, 1070, 1080 communicating with the core functionality 1000.

Within the data memory 1020 cartographic data are stored in a database, on the basis of which data the navigation instrument 100 calculates a route or a local rerouting. As an alternative to an on-board storage of cartographic data, the navigation device 100 may include a device for establishing an online connection (e.g. GPRS connection), in order to obtain cartographic data from a central server for the determination of a route and/or local rerouting.

The device 1040 for detecting a telephone call has been set up to detect an incoming telephone call (or generally a message of a telecommunications service) and to signal said call to the device 1050 for determining a distance. For this purpose the device 1040 may be in direct communication with a mobile telephone, smartphone or PDA. As an alternative to this, the mobile telephone, smartphone or PDA may be in communication with the navigation device 100. The telephone call is then signalled to the device 1040 via the core functionality 1000. Furthermore, the device 1040 can signal the end of the telephone call.

The device 1060 for determining a distance is in communication with the core functionality 1000 and with the device 1040. As a response to the signalled telephone call, the device 1060 determines, on the basis of cartographic data and on the basis of a current vehicle position, the distance (d, t) of a vehicle to a forthcoming route reference point or to an output of a forthcoming manoeuvre instruction of a route calculated by means of cartographic data. The determined distance (d, t) is subjected by the device 1060 to a comparison with a first or second threshold value ($D_1$, $T_1$, $T_2$). Furthermore, the device 1060 has been designed to determine the distance (d, t) between the forthcoming route reference point and at least one route reference point following the forthcoming route reference point. The determined distance (d, t) is, in turn, subjected to a comparison with a third threshold value ($T_3$).

The delay device 1050 is in communication with the devices 1040, 1060 of the navigation device 100. Furthermore, the delay device 1050 may be in direct communication with a mobile telephone, smartphone or PDA. The delay device 1050 has been designed to delay the signalling of incoming telephone calls in a manner depending on a threshold-value signal received from the device 1060. In this connection the acoustic output of a ringing tone or of a visual indication of the telephone call is delayed until such time as a (where appropriate, advanced) manoeuvre instruction has been output.

The device 1070 for determining a local rerouting has been set up to determine, on the basis of the cartographic data stored in the data memory 1020 or transmitted online, a local rerouting relating to the calculated route. The determination of the rerouting is effected in response to a trigger signal sent from the device 1060, the trigger signal depending on the third threshold value ($T_3$). The device 1060 additionally analyses the type of road on which the vehicle is located at the present time and then decides whether or not a rerouting will be calculated.

The device 1080 for modifying an instruction has been set up to modify a standardised manoeuvre instruction for a forthcoming route reference point if the distance to the forthcoming route reference point falls short of a first threshold value ($D_1$, $T_1$). The manoeuvre instruction may in this connection be shortened, extended, or combined with further manoeuvre instructions and/or additional instructions stored beforehand. Furthermore, the device 1080 can generate instructions relating to a local rerouting.

The output device 1090 is finally provided for the output of the (modified) manoeuvre instructions and also of the incoming telephone calls. The output for this may be performed acoustically and/or visually. According to an embodiment, the manoeuvre instruction may be output visually, and the telephone call acoustically.

In the following, an embodiment of the process according to the invention for controlling incoming telephone calls during a route guidance will be described with reference to the flow chart represented in FIG. 2. The process will be elucidated on the basis of the navigation device 100 represented in FIG. 1 but may also be implemented by instruments configured otherwise (e.g. a smartphone).

In a first step S1, by means of device 1040 for detecting a telephone call an incoming call is detected and is signalled to the device 1060 for determining a distance.

In a second step S2 the device 1060 determines the distance (d, t) of the vehicle to the forthcoming route reference point or to the output of the forthcoming manoeuvre instruction pertaining to the route. Furthermore, the determined distance (d, t) is compared with the first threshold value ($D_1$, $T_1$). If the value of the determined distance (d, t) is greater than or equal to the predetermined first threshold value ($D_1$, $T_1$), in a step S3 the call is put through and is reproduced via the output device 1090. If, however, the determined distance (d, t) falls short of the first threshold value ($D_1$, $T_1$), the incoming telephone call is delayed by the delay device 1050 (step S4) until such time as a (where appropriate, modified) manoeuvre instruction for the forthcoming route reference point has been output.

According to one embodiment, the determined distance (d, t) is converted into a time interval (t) with the aid of a current driving speed. For this purpose the current driving speed ($v_{curr}$) of the vehicle and the spatial distance (d) with respect to the forthcoming route reference point or to the output of the forthcoming manoeuvre instruction at the time of the incoming telephone call are used. In this connection, the time distance (t) is calculated from the quotient of the spatial distance (d) and the current driving speed ($v_{curr}$). Correspondingly, the first threshold value ($D_1$, $T_1$) is predetermined as first time threshold value ($T_1$). The use of time intervals (t) and the comparison with a first time threshold value ($T_1$) has the advantage that the control of incoming telephone calls can be adapted better to the current traffic situation. For example, a vehicle may be located in the immediate vicinity of a forthcoming route reference point, but by reason of a high volume of traffic or a traffic jam the time interval (t) may exceed the first time threshold value ($T_1$), so that the delaying of an incoming telephone call and the early output of the manoeuvre instruction are not necessary. Such a first time threshold value ($T_1$) may lie within the range of 5 minutes. The first threshold value ($D_1$, $T_1$) may have been preset or may be predetermined by the driver.

Figure 2:
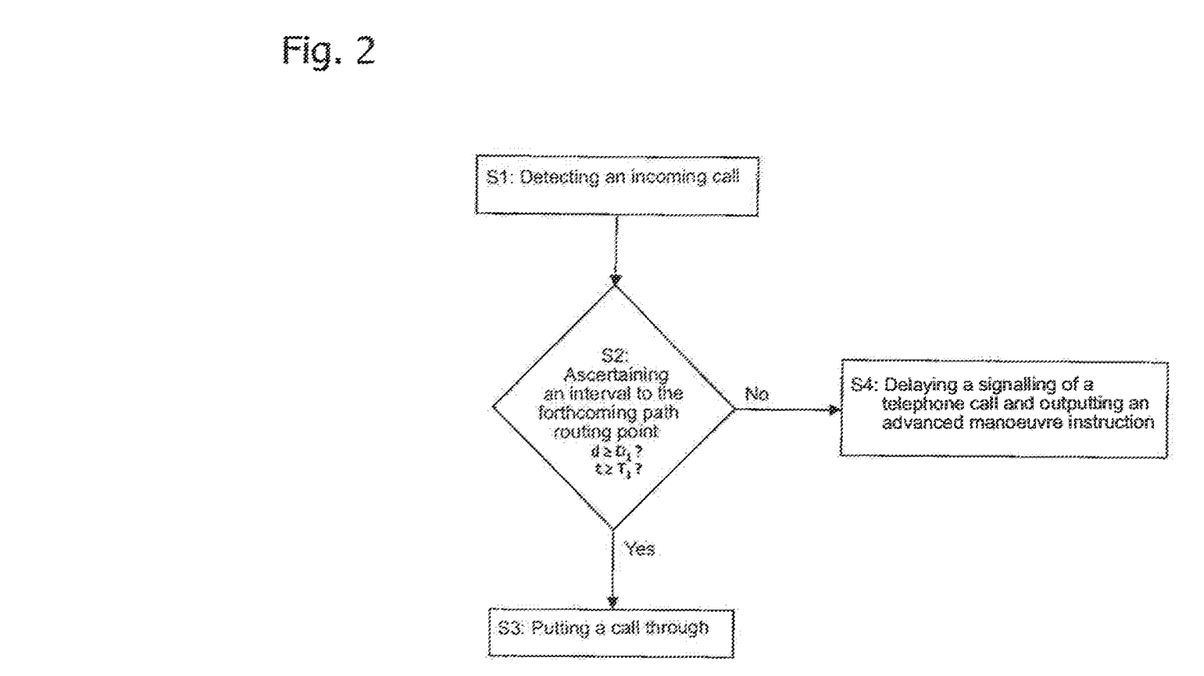
FIG. 2 shows a method according to an exemplary embodiment of the present invention.
Figure 3:
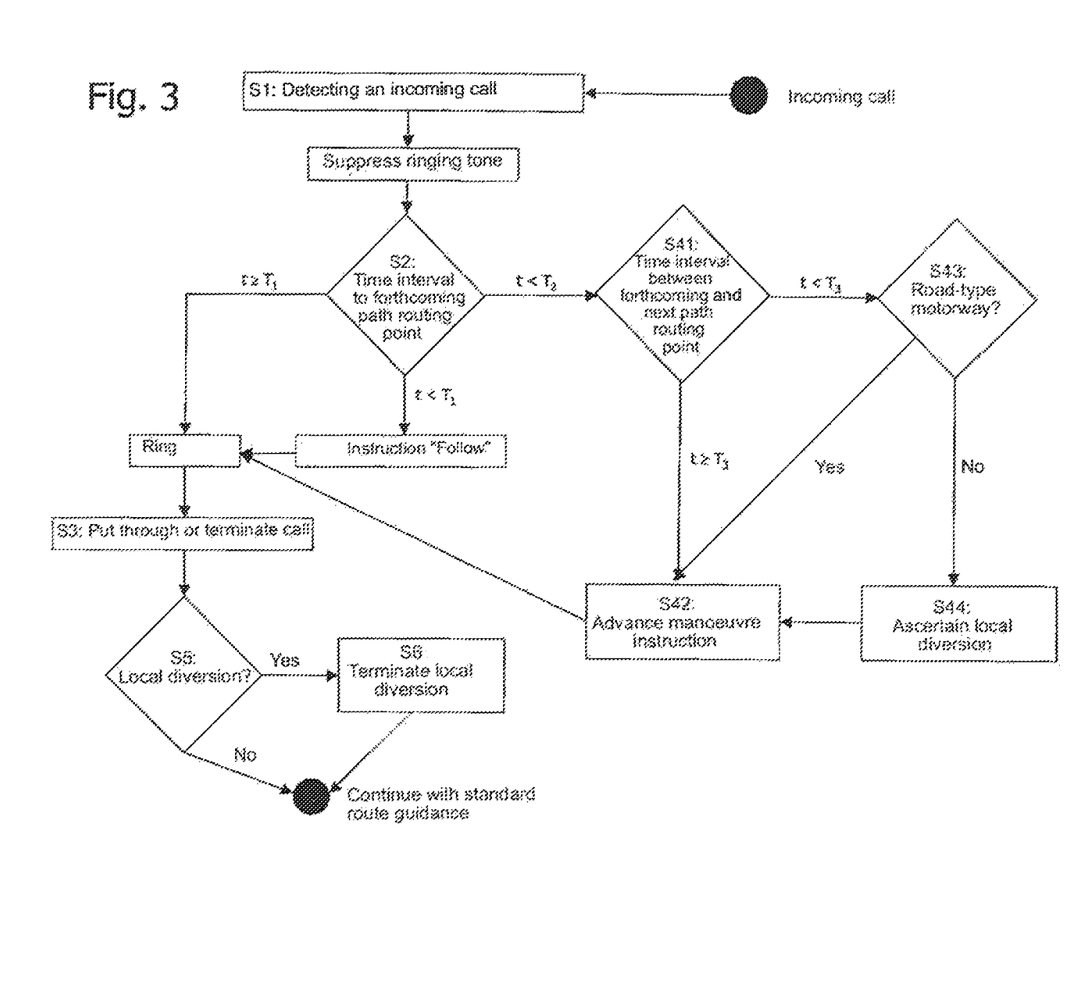
FIG. 3 shows a detailed representation of the method according to FIG. 2.

On the basis of FIG. 3 the process presented in FIG. 2 will be elucidated in more detail. The steps being equivalent to FIG. 2 are denoted by the same reference symbols.

In a first step S1 an incoming call is detected. In this connection the ringing tone of the incoming telephone call is suppressed by the delay device 1050. At the same time, the device 1060 for determining a distance determines in the following step S2 the time interval (t) to the forthcoming route reference point or to the output of the forthcoming manoeuvre instruction. As elucidated above, the time interval (t) can be estimated from the spatial distance (d) and the current speed ($v_{curr}$) at the time of receipt of the telephone call. If the estimated time interval (t) is greater than or equal to the first time threshold value ($T_1$), the call is put through during the route guidance, by forwarding the suppressed ringing tone to the output device 1090.

If the determined time interval (t) falls short of the first time threshold ($T_1$), an instruction in the form of "follow the road", in conjunction with an additional statement relating to the distance and/or the estimated time up until the forthcoming route reference point (e.g. "follow the road for 5 km"), is output by the output device 1090. Subsequent to this, the ringing tone of the incoming telephone call is reproduced. Due to this instruction the attention of a driver is drawn to a forthcoming manoeuvre in good time. In a further embodiment, the instruction "follow the road" may have been linked with additional manoeuvre instructions (e.g. "follow the road for 5 km and at the following roundabout take the 2nd exit"). Informed about the forthcoming manoeuvre, the driver can then decide himself/herself whether or not he/she will accept the telephone call.

If the time interval (t) determined in step S2 falls short of the second time threshold value ($T_2$), which is smaller than the first time threshold value ($T_1$), the device 1060 for determining an distance additionally determines, in a further step S41, the time distance (t) between the forthcoming route reference point and a route reference point following the forthcoming route reference point. Typical values for the second time threshold value ($T_2$) lie within the range between 2 minutes and 5 minutes.

If in this connection the determined time interval (t) between the two consecutive route reference points is greater than the predetermined third time threshold value ($T_3$), in a step S42 an advanced manoeuvre instruction is output via the output device 1090 and, subsequent thereto, the suppressed ringing tone is reproduced. The advanced manoeuvre instruction may in this connection have been modified with respect to an original instruction. It may, for example, include the current spatial distance (d) and/or an estimated time interval (t) to the manoeuvre. In an alternative embodiment, the advanced manoeuvre instruction also includes instructions for the following manoeuvre. Such an instruction may read, for example: "in 200 meters at the intersection turn left into the main road and then after 500 meters at the roundabout take the third exit". Furthermore, these instructions may be reproduced in abbreviated form.

If the measured time interval (t) between two consecutive route reference points falls short of the predetermined third time threshold ($T_3$), in a step S43 and in a following step S44 a local rerouting relating to the determined route is determined, if need be, with the aid of the device 1070. Firstly, in step S43 the type of road is determined on which the vehicle is located at the present time. In case of a motorway, no rerouting is calculated. In this case, in analogue to the case of exceeding the third time threshold ($T_3$), an advanced (modified) manoeuvre instruction relating to the forthcoming route reference point is output. Otherwise, in step S44 a local rerouting relating to the determined route is determined, the rerouting being chosen in such a manner that complicated, consecutive manoeuvres are avoided as far as possible. After determination of the rerouting, once again an advanced manoeuvre instruction (S42) is output, which is followed by the incoming telephone call. The advanced manoeuvre instruction in this case includes instructions relating to the forthcoming manoeuvre and optionally additional instructions relating to the rerouting.

The local rerouting (step S5) is performed until the telephone conversation has been terminated. After the conversation has been concluded, in a step S6 the local rerouting is terminated, by the driver being guided back to the original route. Subsequently the driver is again located on the predetermined route.

The method described herein, allows temporally coordinating manoeuvre instructions and incoming telephone calls with one another during a route guidance in such a manner that incoming telephone calls and manoeuvre instructions do not coincide and thereby disturb the route guidance. Furthermore, by consideration of further route reference points following the forthcoming route reference point a complex sequence of manoeuvres closely following one another can be detected in good time, and, where appropriate, a rerouting can be determined that avoids the complex succession of manoeuvres closely following one another. A driver can then conduct a telephone conversation without having to worry about straying too much from the predetermined route.

While the technique presented herein has been described with respect to particular embodiments, those skilled in the art will recognize that the present invention is not limited to the specific embodiments described and illustrated therein. It is to be understood that this disclosure is only illustrative. Accordingly, it is intended that the invention be limited only by the scope of the claims appended hereto.

The invention claimed is:

1. A method of controlling a signalling of incoming telephone calls during a route guidance, comprising:
   detecting an incoming telephone call during the route guidance along a predetermined route, the predetermined route including a plurality of route reference points and a series of manoeuvre instructions, wherein each of the route reference points is associated with a manoeuvre instruction to be output a certain distance ahead of the corresponding route reference point;
   determining a distance to a forthcoming route reference point of the predetermined route or to an output of the manoeuvre instruction corresponding to the forthcoming route reference point, in response to the detected telephone call;
   in response to a determination that the distance to the forthcoming route reference point or to the output of the manoeuvre instruction corresponding to the forthcoming route reference point falls short of a predetermined first threshold value, delaying the signalling of the incoming telephone call and deriving a modified instruction, wherein, in a case where the distance to the forthcoming route reference point or to the output of the manoeuvre instruction corresponding to the forthcoming route reference point is greater than or equal to a predetermined second threshold value, the predetermined second threshold value being less than the predetermined first threshold value, the modified instruction is derived in the form of an abbreviated instruction from the manoeuvre instruction corresponding to the forthcoming route reference point, and wherein, in a case where the distance to the forthcoming route reference point or to the output of the manoeuvre instruction corresponding to the forthcoming route reference point falls short of the predetermined second threshold value, a local rerouting from the predetermined route is determined by analyzing the series of manoeuvre instructions and the modified instruction is derived to include instructions relating to the local rerouting;

outputting the modified instruction before the signalling of the incoming telephone call;

signalling the telephone call; and in a case where local rerouting has been determined, performing the local rerouting until the telephone call terminates.

2. The method according to claim 1, wherein the incoming telephone call generally includes a message of a telecommunications service.

3. The method according to claim 1, wherein the local rerouting is terminated and a driver is guided back onto the predetermined route when the telephone call has been concluded.

4. The method according to claim 1, wherein the determination of the local rerouting depends on a type of road on which a vehicle is located.

5. The method according to claim 1, further comprising determining a distance between the forthcoming route reference point and at least one following route reference point.

6. The method according to claim 5, wherein the at least one following route reference point following the forthcoming route reference point is included into the manoeuvre instruction that is output.

7. The method according to claim 5, further comprising determining a local rerouting if the distance between the forthcoming route reference point and the at least one following route reference point falls short of a predetermined third threshold value.

8. The method according to claim 7, wherein the local rerouting is terminated and a driver is guided back onto the predetermined route when the telephone call has been concluded.

9. The method according to claim 7, wherein the determination of the local rerouting depends on a type of road on which a vehicle is located.

10. The method according to claim 7, wherein the manoeuvre instruction that is output includes instructions relating to the local rerouting.

11. The method according to claim 1, wherein the predetermined first threshold value is a time threshold value and the determined distance is a time interval.

12. The method according to claim 11, wherein the time interval is estimated from a current driving speed and a determined spatial distance to the forthcoming route reference point, to the route reference point following said forthcoming route reference point, or to the output of the forthcoming manoeuvre instruction.

13. The method according to claim 1, wherein the manoeuvre instruction that is output depends on the distance to the forthcoming route reference point or to the output of the forthcoming manoeuvre instruction.

14. A non-transitory computer-readable recording medium storing instructions according to the method of claim 1.

15. An apparatus for controlling a signalling of incoming telephone calls during a route guidance, comprising:

a device for detecting an incoming telephone call during the route guidance along a predetermined route, the predetermined route including a plurality of route reference points and a series of manoeuvre instructions, wherein each of the route reference points is associated with a manoeuvre instruction to be output a certain distance ahead of the corresponding route reference point;

a device for determining a distance to a forthcoming route reference point of the predetermined route or to an output of the manoeuvre instruction corresponding to the forthcoming route reference point, in response to the detected telephone call;

a delay device configured to delay, in response to a determination that the distance to the forthcoming route reference point or to the output of the manoeuvre instruction corresponding to the forthcoming route reference point falls short of a predetermined first threshold value, the signalling of the incoming call, and deriving a modified instruction, wherein in a case where the distance to the forthcoming route reference point or to the output of the manoeuvre instruction corresponding to the forthcoming route reference point is greater than or equal to a predetermined second threshold value, the predetermined second threshold value being less than the predetermined first threshold value, the modified instruction is derived in the form of an instruction that has been abbreviated with respect to, the manoeuvre instruction corresponding to the forthcoming route reference point, and wherein, in a case where the distance to the forthcoming route reference point or to the output of the manoeuvre instruction corresponding to the forthcoming route reference point falls short of the predetermined second threshold value, a local rerouting from the predetermined route is determined by analyzing the series of manoeuvre instructions and the modified instruction is derived to include instructions relating to local rerouting;

an outputting unit for outputting the modified instruction before the signalling of the incoming telephone call;

a device for signalling the telephone call; and a device for performing, in a case where local rerouting has been determined, the local rerouting until the telephone call terminates.

16. The apparatus of claim 15, further including a device for determining the local rerouting, which has been set up to calculate a local rerouting for the predetermined route if the distance (d, t) to the forthcoming route reference point or to the output of a forthcoming manoeuvre instruction falls short of the predetermined second threshold value or the distance between the forthcoming route reference point and a following route reference point falls short of a predetermined third threshold value.

17. A navigation device including the apparatus according to claim 15.

\* \* \* \* \*